Feb. 13, 1940. A. F. SLATER 2,190,086
AUTOMOBILE PARKING APPARATUS
Filed July 12, 1937 2 Sheets-Sheet 1

INVENTOR
August F. Slater
BY J. L. Rivers,
ATTORNEY

Feb. 13, 1940.   A. F. SLATER   2,190,086
AUTOMOBILE PARKING APPARATUS
Filed July 12, 1937   2 Sheets-Sheet 2

INVENTOR
August F. Slater
BY J. R. Rivers
ATTORNEY

Patented Feb. 13, 1940

2,190,086

UNITED STATES PATENT OFFICE 2,190,086

AUTOMOBILE PARKING APPARATUS

August F. Slater, Seattle, Wash.

Application July 12, 1937, Serial No. 153,298

1 Claim. (Cl. 214—16.1)

This invention has reference to improvements in automobile parking apparatus of the type designed to be installed in a building for multi-parking purposes.

One of its objects is, to provide in a suitable structure having a plurality of floors, elevating mechanism whereby an automobile may be carried to any desired floor and then caused to be tilted so that said automobile will, through the force of gravity, roll out of the elevating mechanism to a predetermined position.

Another object is, to provide a transfer car or carriage having channeled and tiltable guideways adapted to receive said automobile as it leaves an elevating mechanism, and through which it may be readily wheeled away and then transferred in a like manner, by gravity, to a desired location on said floor; the said car or carriage being also provided with an additional pair of like guideways, operable independently of the first-named guideways, for conveying and transferring in a similar manner a second automobile.

Another object is to provide a plurality of parking stalls, disposed in tandem having front and rear stalls, each stall having wheel guideways tiltable at each end and adapted to receive said automobile from the transfer carriage by gravity or from the stall forward or rearward thereof.

Another object is the provision of tandem parking for a plurality of automobiles with means to easily and safely park and remove an auto, regardless of its position.

Another object is the provision of greater parking facilities in a building with a minimum of transfer space and thus conserve valuable space in buildings devoted to the parking and storage of autos.

Another object is a method of parking and the delivery of parked cars to and from storage stalls.

Another object is a method of transferring and switching vehicles parked in tandem while utilizing a minimum of space, thus making it possible to reserve certain parking spaces where a tandem parkng service is provided.

Still further objects are the conservation of space, so desirable in multi-parking in buildings, the same being brought about by a plurality parking of automobiles end to end, thereby reducing the number and area of halls or passages necessary to afford access thereto as compared with a construction wherein automobiles are parked abreast. The means provided for handling the automobiles, rather than utilizing their own power, is also a contributing factor in saving space. The apparatus as an entirety is a conservator of labor, and affords a more facile and economical way for parking automobiles in relatively large numbers, the same being more particularly advantageous and practical within close-in business districts where space is ordinarily limited and expensive.

The following illustrations and descriptions are set forth to disclose to those skilled in the art how to make, vend and use one form of the invention, but it is to be understood that this disclosure is not to be taken as limiting the scope of the invention, except as limited by the depending claim.

In the accompanying drawings:

Figure 1 is a plan view of a floor of a building, with said apparatus installed therein.

Figure 2 illustrates in side elevation two of the upper floors of said building, the building being broken away and shown in sections so as to show an elevator shaft, and the view including an automobile parked in one of the rear stalls and another automobile disposed on the transfer carriage and tilted as it is about to enter the front stall contiguous to the rear stall. The floor above shows a transfer carriage with its guideways lowered into normal position, and two automobiles parked in tandem in one of the stalls.

Figure 2:
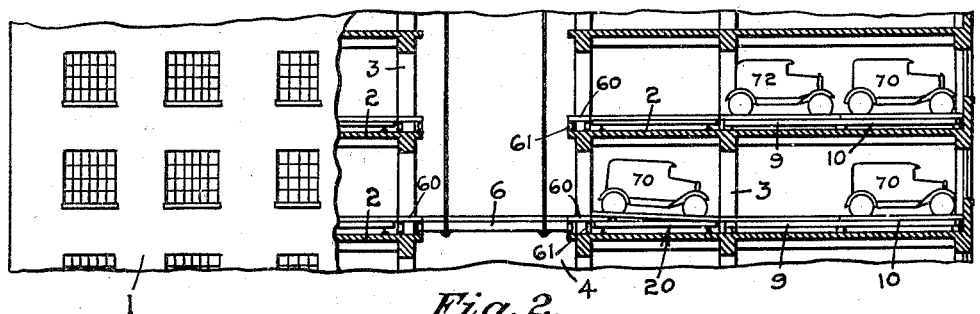

Referring more particularly to the drawings, numeral 1 denotes a building having one or more stories, and in which the apparatus is to be installed. While the apparatus may be installed in a building having but a single floor, it is presumed the apparatus will find its greatest use in buildings having a plurality of floors in which an elevating mechanism is provided. The floor shown in Figure 1 and those indicated in Figure 2 are upper floors of a parking building; the assembly and parking system or method to be described will be the same for each floor. In said building, 2 denotes some of the upper floors having supporting posts 3, elevator shafts 4 and stairways or stair cases 5. A number of elevators are provided, each designated as 6 (see Figure 2) having a capacity sufficient to carry at least one automobile, but elevators of two or more cars may be used to advantage. The elevators are of usual construction, except as modified to meet the requirements and the methods and apparatus herein disclosed as will hereinafter more particularly appear.

Figure 1:
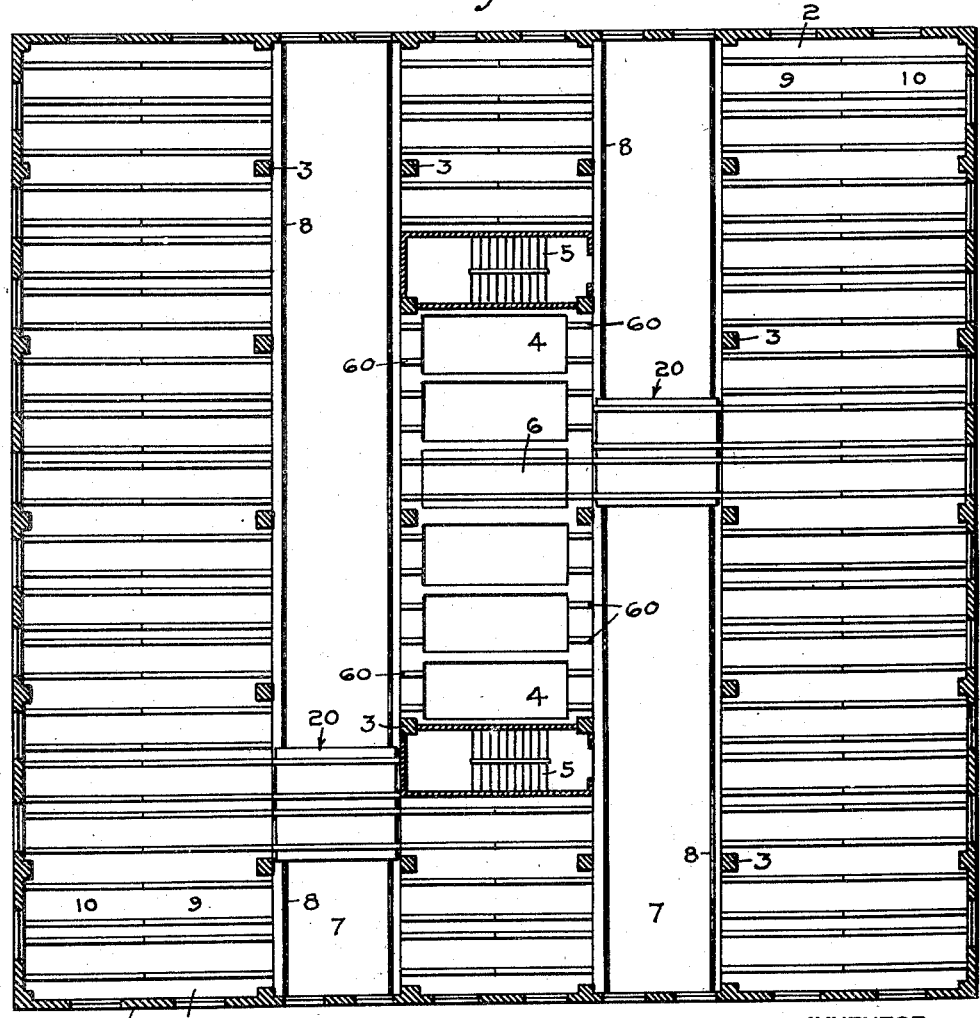

The floor 2, as it appears in Figure 1, is provided with two passages or corridors 7 in communication with the elevators and stalls. A track 8 constructed from ordinary car rails of suitable weight, is laid in each of the passages. A plurality of parking stalls are provided, and may consist of tandem pairs comprising a front and rear stall, denoted as 9 and 10, respectively, in the drawing. The installation may be the same on each floor, each stall of a pair being disposed in end to end relation, and all of said front stalls facing one of said passages. The particular construction of said stalls will be described in order.

Figure 4:
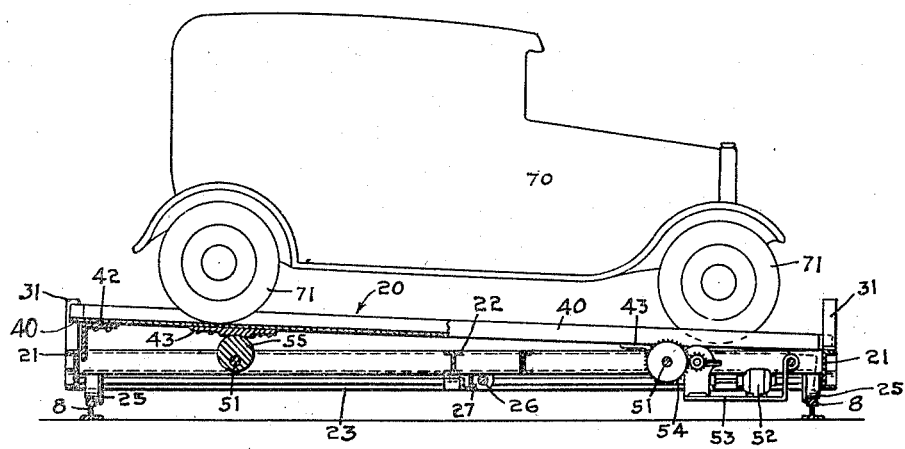
Figure 4 is a longitudinal view of the carriage, partly in section, substantially along the line 4—4 of Figure 3, showing an automobile disposed thereon.
Figure 3:
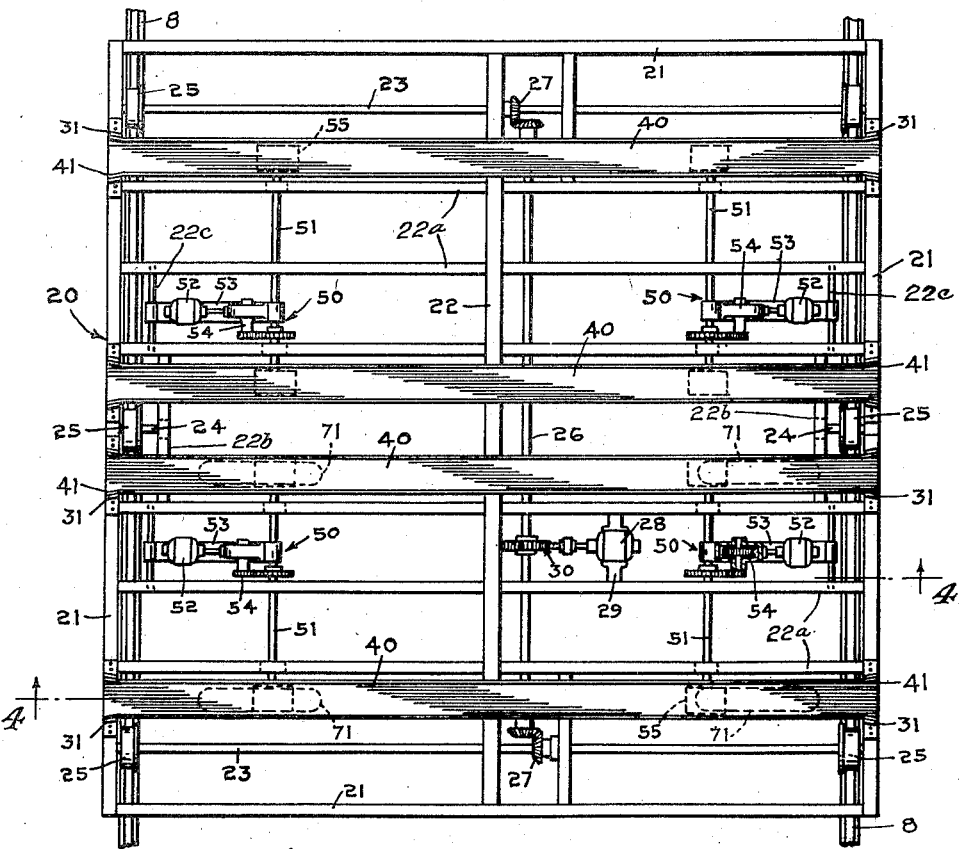
Figure 3 is a plan view of the carriage, including the track on which it is designed to run, said track being broken away.

The transfer carriages, generally designated as 20, will now be described. Each carriage is constructed as shown in Figures 3 and 4. The body comprises a rectangular channel iron frame 21 which is the perimeter for the carriage. Preferably metallic construction is preferred, but other suitable material may be employed. This frame is reenforced by a centrally disposed I beam 22, and smaller cross beams 22a. Diagonal stiffeners or braces may also be employed should they be desirable to insure perfect rigidness. A pair of transverse shafts, each denoted as 23, are journaled in said frame adjacent to each end thereof and extend across the same. A pair of shorter shafts 24 are journaled in the sides of the main frame and short beams 22b which are fixed to beams 22a, as indicated in Figure 3. Said shafts provide axles for a plurality of flanged car wheels 25, rotatable therewith, and said wheels obviously afford wheeled connections for the carriage with the track 8 so that it can run thereon, and thus be shifted the length of the passages or corridors 7.

Power for propelling the carriage is applied to the shafts 23 through a longitudinal shaft 26 journaled in the frame at any convenient place and connected with the shafts 23 by the gearing assembly 27. An electric motor 28, of the reversible type, is mounted in an underslung support 29 fixed between the cross beams 22a and operates through a speed reduction gearing assembly, generally denoted as 30, to transmit power to the shaft 26. As it may be noted, the shafts 24 are not connected with said motor but are merely idlers to help bear the load. The shafts 24 and the wheels rotatable therewith, disposed at the sides of the carriage, obviously provide supporting and wheeling means for the carriage on said track and are merely auxiliary to the power driven wheels at the ends of the carriage. Under normal operation of said motor the carriage is driven forwardly through the instrumentalities described, and driven backwardly in the same manner by reversing the motor. It is evident that a motor of any suitable rating may be utilized, however, a three-horse power electric motor may be satisfactorily employed for driving a transfer carriage of the capacity of the one shown here on a track and for the purposes to which I have heretofore referred.

A plurality of pairs of upstanding, spaced and outwardly flared flanged elements 31 are bolted at intervals along the side edges and top side of the frame 21, each pair along either side being disposed oppositely of a like pair on the other side of said frame. Mounted within these elements and seated on said frame are four guideways of relatively heavy metallic construction and substantially U-shaped in cross section, each denoted as 40. They are disposed in pairs, the guideways of a pair being spaced apart so as to accommodate the wheels of an automobile. Said guideways and the mountings thereof are of identical construction, consequently a description of one will suffice for all.

Each end of a guideway is flared, as at 41, to facilitate the entry of vehicle wheels and particularly, automobile wheels therein. The guideway ends and the adjacent supports 31 are complementary to each other, thereby preventing lateral movement of the guideway on the frame. A member 42, of angle iron construction, is secured to the under-side and at each end of the guideways. These members are spaced from the edges a sufficient distance to allow an overlapping portion 40 to rest upon the top of the frame channels. The depending legs of the angle iron members act as guides to keep the wheel guides 40 in longitudinal position whereas the upstanding legs of the elements 31 act as guides to prevent appreciable lateral movement of the wheel guides. This arrangement is designed to allow free vertical movement of the guideways. As it may be noted in Figure 4, the member 42, while slidably engageable with the frame so as to permit tilting of the guideway, is of a sufficient length to retain contact with said frame and receive the end thrust when the guideway is in the raised position shown. The reference character 43 designates a heavy plate bolted to the underside and adjacent each end of the guideway and against which operate cams for tilting the guideway as will presently be described.

In the transfer carriage, as illustrated in Figure 3, four devices of like construction are shown for tilting purposes, two for each automobile carried by the carriage. Such a tilting device may be at the front of the automobile guideways or at the rear thereof, or both, and for convenience of description each unit of instrumentalities for performing such tilting function is designated generally as 50.

Each of said devices, located underneath and adjacent the ends of each pair of said guideways, comprises a shaft 51, suitably journaled in the cross beams 22a; an electric motor 52 mounted in a depending support 53, which is in the form of a U-bracket having its supports on a bearing upon the shaft 51 and upon a cross bar 22c; and speed reduction gearing assembly 54 operatively connected with the motor 52 and the shaft 51. To each end of the shaft 51 is fixedly secured a cam 55, each being adapted to work on the oppositely located plates 43 carried by the pair of guideways. The motor 53 is designed preferably to be of about one and one-half horse power, and the speed reduction gearing 54 is adapted to impart a predetermined movement to said cams when power is applied by said motor. While it is obvious that in a pair of these guideways a single electric motor could be employed to operate both shafts 51 to perform the tilting function, it adds to the cheapness and simplicity of the device to install separate electric motors of low horse power and relatively low in cost and thus eliminate the mechanical connecting elements which would be required in using a single electric motor of greater horse power. As is evident, when a pair of cams are actuated through the instrumentalities just described, they will cause the pair of guideways on which they operate to be tilted. Their mode of operation will be described in detail hereinafter.

The assembly described relative to the transfer carriage is also designed to be utilized in each of the elevators 6, a slight modification being made and certain parts eliminated to accommodate it thereto. Such a tilting device is installed on the floor of the elevator, the wheels 25 and the mechanism which actuates the driven wheels being then eliminated. The wheels may, if desirable, be replaced by legs which serve to elevate the frame to the same height as produced by said wheels. The provision of these legs constitutes the only change in construction from that already described, and they obviously may be of any suitable form and secured to the frame by bolts, or otherwise. Further, two of the tilting devices may be omitted, as it may be desirable that the mechanism installed in an elevator be designed to operate in tilting an automobile at one end only.

Where single stalls might be used, or rear stalls like 10, mechanism to tilt the guideways one way may be used but, when tandem parking is provided, two way tilting of an automobile is required for all stalls except the one next to a wall of the building, therefore, four of the tilting devices 50 are included, as in the transfer carriage. Each of the rear parking stalls may, however, be equipped with two-way tilting mechanism in the event that the building wall is removed and an annex building be used for extending the parking facilities.

It is contemplated that the elevators, the electric motors, and other devices of the apparatus are to be under automatic electric control, remote or otherwise, including switches and other devices of this nature which are available and well known to those skilled in the art. Further, that the application of electrical energy to said motors and other devices of the apparatus, shall be effected in suitable ways and which also are well known. Such instrumentalities do not constitute a part of my invention, consequently the same are not shown herein. Also, the speed reduction gearing effective in this apparatus presents usual construction, and for this reason a detailed description of the same is not given.

The building shown and in which the apparatus is installed presents usual construction in its framework, and, as it may be noted in Figure 1, the supporting posts 3, forming part of the elevator shafts, will not permit the transfer carriages to contact directly and properly register with the elevators, in view of the fact that each of the two carriages shown run on tracks and must of necessity clear said posts. To bridge the gap between said elevators and transfer carriages running on the tracks, a plurality of short guideways 60, supported on standards 61, are disposed adjacent the ends of each elevator, said guideways being of the same construction as the guideways 40, and adapted to align with a pair of guideways in an elevator and the guideways on a transfer carriage facing said elevator, thereby affording continuous guideways for an automobile from the elevator to said transfer carriage. It may also be observed in Figure 1 that said elevators are open at each end and may thus be served by two transfer carriages.

In utilizing the apparatus in parking automobiles, it is assumed, for instance, that an automobile 70 has been driven on to the ground floor of said building and into one of the elevators 6, the elevator, obviously, being so disposed that the guideways 40 are substantially even with said floor in order that the wheels of the automobile may enter said guideways. The automobile is then carried by the elevator to the desired floor and the guideways in said elevator brought into alignment with the complementary guideways 60. Then assuming that a transfer carriage has been brought into position in front of said elevator so that at least one pair of the guideways on said carriage are in alignment with said guideways 60; the automobile is now ready to leave said elevator and to be received by said transfer carriage. This is accomplished by putting in motion a pair of cams 55 and tilting the car into the position shown in Figure 4.

The motor 52, which may be started and stopped in any suitable manner as by remote control on the first floor or by an operator in the elevator, is designed, through the speed reduction gearing 54, to rotate the shaft 51 slowly and impart a like speed to the pair of cams 55 connected therewith. When about a half a turn of said cams is effected the guideways on which they operate will be raised and the automobile will be tilted into the position last referred to, and said motor may be then stopped automatically, if desired.

The automobile, through the force of gravity, then slowly rolls along the guideways 40 in the elevator on to the adjacent and horizontally disposed guideways 60, thence to the horizontally located guideways 40 on said transfer carriage. The guideways in the elevator are inclined to a degree sufficient to permit the automobile to thus roll into place on the transfer carriage, said horizontally disposed guideways obviously serving to retard its movement after it leaves the elevator. The tires 71 of said automobile will now occupy on the transfer carriage about the positions shown by the dotted lines bearing this numerical designation in Figure 3. The transfer carriage, carrying said automobile, is now set in motion, through the motor 28 and the instrumentalities cooperating therewith, and the automobile is conveyed by said car to a point oppositely of the pair of stalls 9 and 10 to be utilized in parking said automobile, and positioned so that the guideways of said car are in alignment with the horizontally disposed guideways of the front stall 9 of the tandem pair. The automobile is then tilted, as indicated in Figure 2, through the action of the cams heretofore described, and it will then roll down the incline thus formed and be transferred by the force of gravity to the guideways of the front stalls 9. Should it be desired to park the automobile in the adjacent rear stall 10 of the pair, the automobile is tilted by raising the proper ends of the guideways of the stall 9, when the automobile will then roll from said guideways to the horizontally disposed guideways of the stall 10; the automobile then being parked in the rear stall, as shown in Figure 2. The rear stall of said pair now being occupied, another automobile 72 obviously may be parked in the front stall in the manner heretofore indicated, and as illustrated in Figure 2.

The two automobiles having been parked in a pair of stalls, as shown, it is assumed now that it is desirable to remove the automobile from the rear stall and reserve said stall for the subsequent parking of said automobile therein. This may be accomplished and still reserve the front stall for the automobile 72 by positioning the transfer carriage relative to the front stall, as indicated in Figure 2. By shifting the automobile 72 to said carriage, by raising the guideways of the stall 9 rearwardly so that they incline toward said carriage, the said automobile is then transferred by gravity to the contiguous pair of guideways on said carriage. The guideways of the front stall 9 are then lowered into normal position, and the transfer car is then moved so that its second and unoccupied pair of guideways are brought into alignment with the guideways of said front stall. The guideways of the rear stall 10 are then raised so as to incline them forwardly, when the automobile 70 will be shifted by gravity to said front stall and thence to the second pair of guideways on said transfer carriage, obviously in the same manner as the automobile 72 was transferred thereto, as just described. The transfer carriage, now having two automobiles disposed thereon, is positioned so that the guideways on which the automobile 72 is retained are brought into alignment with the guideways of the front stall, and the automobile 72 may be then returned through gravity action to said front stall, and the automobile 70 conveyed by the transfer carriage and shifted to an elevator for removal from the floor.

Should the automobile 70 be returned for parking in its said stall, a shifting of the automobile 72 to the transfer car, will permit the automobile 70 to take its rear stall, and the automobile 72 to be returned to its front stall, all effected through the tilting of the guideways on the transfer carriage and in said stalls, and the bringing of said carriage into proper juxtaposition with the guideways in the front stall.

From the foregoing operations, as detailed, it is evident that an automobile in a front stall can be readily removed therefrom to the transfer carriage and thence conveyed away, without disturbing an automobile parked in the rear stall of said tandem pair. Said operations are illustrative of this invention in utilizing the force of gravity in shifting automobiles in parking, but it is obvious that other capabilities are inherent in the apparatus and that automobiles may be handled through it in other ways than those expressly detailed here. Further, that the apparatus may be simplified by the provision of a special building having elevator shafts reenforced in such a way that the transfer carriages may be brought into direct contact with the elevators operating in said shafts, and thereby eliminate the guideways 60.

Further, the guideways may be provided with any of the well known automatic stops to make certain that the automobile does not pass beyond the position intended for its stoppage. The operator may, however, in the event such stoppage means are not used, raise the guideways at the end toward which the auto approaches in order to counteract its motion and bring it to rest at a predetermined place.

An experienced operator of the device herein disclosed, would effectively control the movement of the carriages and guideways to smoothly shift automobiles rapidly and at will from some advantageous point in the parking building. It is anticipated, however, that a plurality of transfer carriages may be employed in each passage or corridor and that operators may be placed upon the elevators and that each operator may control the movement of the carriage and personally see cars from his elevator parked in the various stalls.

Changes in and modifications of the construction described, other than those referred to herein, may be made without departing from the spirit of my invention or sacrificing its advantages, hence, it is asked that this invention be not confined to the specific structure set forth.

This application is filed to more adequately express applicant's invention as set forth in his abandoned application, Serial Number 713,246, filed February 28, 1934.

I claim:

In a building for parking automobiles, a plurality of parking floors having a plurality of tandem parking stalls, elevator shafts, and passages connecting the shafts and stalls, a lift in each shaft, and a carrier in each passage designed to carry automobiles abreast, fixed units of material width intermediate said passages and shafts, standard gauge automobile tracks with rails having upstanding flanges fixed thereto and extending the lengths of the lifts, carriers, stalls and across the width of said fixed units, means on the lifts, carriers and in the stalls for raising either track end thereof so that automobiles on the tracks can be rolled by gravity in either direction.

AUGUST F. SLATER.